United States Patent
Belknap

(10) Patent No.: US 7,908,141 B2
(45) Date of Patent: Mar. 15, 2011

(54) EXTRACTING AND UTILIZING METADATA TO IMPROVE ACCURACY IN SPEECH TO TEXT CONVERSIONS

(75) Inventor: William Russell Belknap, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 10/955,886

(22) Filed: Sep. 29, 2004

(65) Prior Publication Data

US 2006/0074895 A1     Apr. 6, 2006

(51) Int. Cl.
G10L 15/26       (2006.01)
(52) U.S. Cl. ........................................ 704/235
(58) Field of Classification Search ............ 704/235
See application file for complete search history.

(56) References Cited

U.S. PATENT DOCUMENTS

| | | | | |
|---|---|---|---|---|
| 5,809,464 A * | 9/1998 | Kopp et al. | ............ | 704/235 |
| 6,173,259 B1 * | 1/2001 | Bijl et al. | ............ | 704/235 |
| 6,360,234 B2 | 3/2002 | Jain et al. | ............ | 707/500.1 |
| 6,507,643 B1 | 1/2003 | Groner | ............ | 379/88.14 |
| 6,615,172 B1 | 9/2003 | Bennett et al. | ............ | 704/257 |
| 6,704,708 B1 | 3/2004 | Pickering | ............ | 704/225 |
| 6,707,889 B1 | 3/2004 | Saylor et al. | ............ | 379/88.04 |
| 7,236,932 B1 * | 6/2007 | Grajski | ............ | 704/277 |
| 7,412,392 B1 * | 8/2008 | Satapathy | ............ | 704/270.1 |
| 2002/0178000 A1 | 11/2002 | Aktas et al. | ............ | 704/235 |
| 2003/0028889 A1 * | 2/2003 | McCoskey et al. | ............ | 725/91 |
| 2005/0216443 A1 * | 9/2005 | Morton et al. | ............ | 707/3 |
| 2006/0190250 A1 * | 8/2006 | Saindon et al. | ............ | 704/235 |
| 2009/0048833 A1 * | 2/2009 | Fritsch et al. | ............ | 704/235 |

OTHER PUBLICATIONS

Khan, L. et al.: "Retrieval Effectiveness of an Ontology-Based Model for Information Section", VLDB Journal, (2004), 13, p. 71-85.
Tucker, R. et al.: "Speech-as-Data Technologies for Personal Information Devices", Pers Ubiquit Comput (2003) 7; p. 22-29.

\* cited by examiner

*Primary Examiner* — Jakieda R Jackson
(74) *Attorney, Agent, or Firm* — Sandra M. Parker, Esq.

(57) ABSTRACT

A computer-based system and method for speech to text conversion preprocessing of a presentation with a speech audio, useable in real time. The method captures a presentation speech audio input to be converted into text, temporally associates the speech audio input with at least one supporting text source from the same presentation containing common keywords and creates an optimized and prioritized keyword positional index metadata set for inputting into a speech to text conversion processor.

21 Claims, 3 Drawing Sheets

EXTRACTING AND UTILIZING METADATA TO IMPROVE ACCURACY IN SPEECH TO TEXT CONVERSIONS

BACKGROUND OF THE INVENTION

1. Field of the Invention

This invention relates in general to speech processing systems performed by computers, and in particular to a method and system for highly efficient media speech recognition processing.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical database management system includes both database files and index files. The database files store data in the rows and columns of tables stored on data pages. In such a table, the rows may correspond to individual records while the columns of the table represent attributes of the records. For example, in a customer information table of a database management system, each row might represent a different customer while each column represents different attributes of the customers, such as the name of each customer, the amount owed by each customer and the cash receipts received from each customer.

Instead of providing for direct sorting and searching of the records in the tables, the database management system relies on the index files which contain information or pointers about the location of the records in the tables stored in the database files. The index file can be searched and sorted (scanned) much more rapidly than can the database files. An index file is scanned through transactions in which criteria are stipulated for selecting records from a table. These criteria include keys which are the attributes by which the database finds the desired record or records using the index. The actions of a transaction that cause changes to recoverable data objects are recorded in a log. In database management systems all data are stored in tables on a set of data pages that are separate from the index file. A table can have one or more indexes defined on it, each of which is an ordering of keys of the row of the tables and is used to access certain rows when the keys are known.

Large database archives, such as the ones used in audio and video libraries of media and other communications industries and educational institutions, depend on content management systems and their media indexing applications to create accurate indexes in order to locate and manage the archived content. Often, the index information has to be obtained in less than ideal situations, such as extracted from audio tracks, and then processed and converted by speech to text conversion technology. Conventional speech to text conversion methods work very well with closely microphoned voice input, using a trained voice and a controlled, small language set. For example, in medical radiology, speech to text conversion technology produces data with very high conversion accuracy. However, when this conventional speech to text conversion technology is applied to non-ideal conditions, such as a multi-way telephone conversation, a commercial video with background music on the audio track or an audio/video conference, the accuracy of speech converted into text is poor and unsatisfactory.

Proper indexing is critical for efficient search and management of large archives or content collections and, therefore, it is necessary to accurately extract and translate index keywords so that they can serve as an effective input for archive indexes. Conventional techniques tend to filter or process the speech audio input, or cause isolation of the spoken audio track prior to processing but these methods are not possible or effective in some situations.

Recently, the technologies for filtering, audio preprocessing and speech processing, including semantic and linguistic methods, have improved. However, the speech to text conversion accuracy is still at a level which is unacceptable for content management indexing applications. Therefore, there is a need for a simple, optimized and generic method and system for improving the efficiency of the speech to text conversion processing, thus increasing text accuracy in media speech recognition and processing systems.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for speech to text conversion preprocessing of a presentation with a speech audio, useable in real time. The method captures a presentation speech audio input to be converted into text, temporally associates the speech audio input with at least one supporting text source from the same presentation containing common keywords and creates an optimized and prioritized keyword positional index metadata set for inputting into a speech to text conversion processor.

Another preferred embodiment of the present invention is a system implementing the above-mentioned method embodiments of the present invention.

Yet another preferred embodiment of the present invention includes a computer usable medium tangibly embodying a program of instructions executable by the computer to perform method steps of the above-mentioned method embodiments of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer program product embedded in a computer usable medium embodying a program of instructions executable by a computer to perform the method of the present invention for highly efficient speech to text conversion preprocessing.

The preferred aspects of the present invention include a positional indexing method, utilized as a preprocessing step of speech to text conversion of a speech audio input, obtained from a live speaker presentation, telephone conference, a recording or an acoustic component of an audio-visual multimedia presentation. Its purpose is to limit the language vocabulary set, before the speech recognition engine performs processing to convert the speech to text, in order to increase the accuracy of the recognized text. The positional indexing method of the present invention associates the speech audio input with at least one other text source that contains critical keywords from the same presentation context and performs data extraction to obtain the keywords. Thus, it processes the presentation materials alternate to the speech audio input, such as a text source supporting the speech audio input, associated to the same context environment and containing the same keywords.

Figure 1:
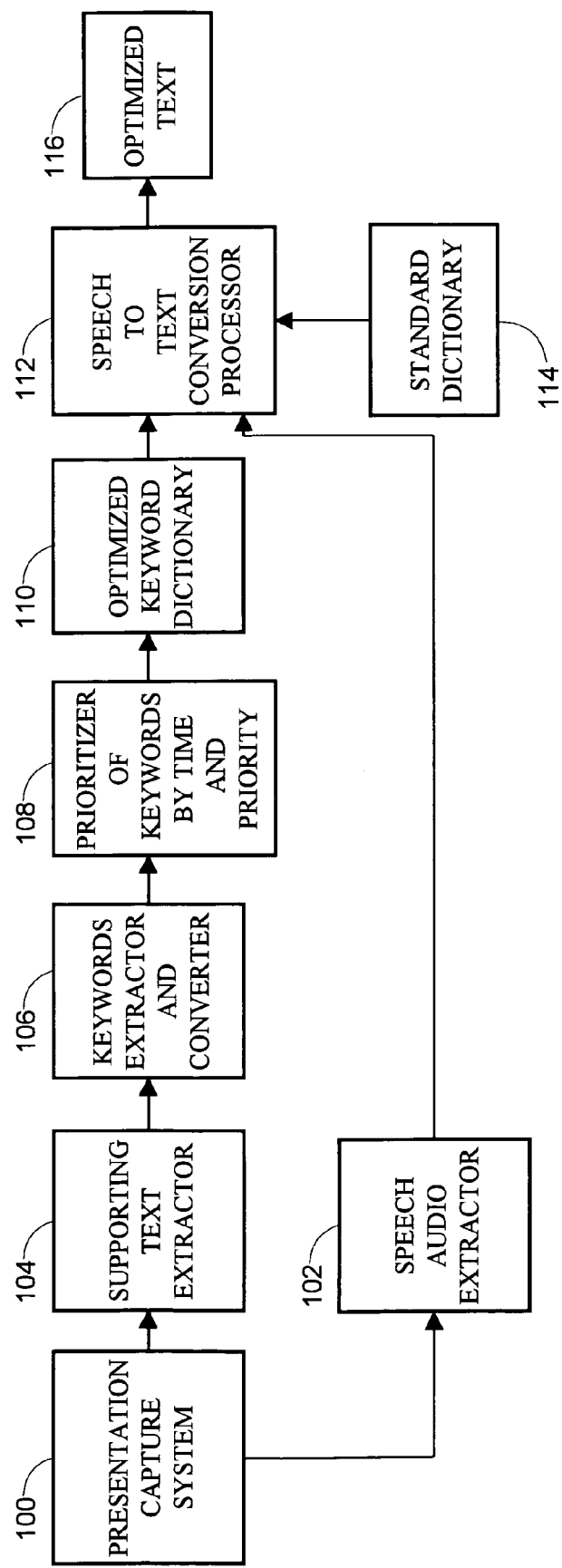
FIG. 1 illustrates a hardware and software environment enabling the method for media speech to text conversion processing, according to the preferred embodiments of the present invention.

FIG. 1 illustrates an exemplary hardware and software environment usable by the preferred embodiments of the present invention and used in speech to text conversion processing. A presentation capture system 100 is used to acquire a speech audio input that needs to be converted into text and an alternate, supporting source which is temporally associated with the speech audio input and contains the critical keywords. For example, they could be the slides accompanying a recorded presentation or telephone conference, the close caption in a commercial video, etc. The system of the present invention further includes an extractor of the speech audio input 102 and an extractor of the supporting text 104.

Extractor of the supporting text 104 extracts the words from the supporting text source, such as presentation display or image, utilizing commonly known methods, such as scanning by Optical Code Readers (OCR), close caption extraction and text capture. Next, a converter and extractor of words 106 is used to send the extracted words to a prioritizer of keywords 108, which prioritizes the keywords from the extracted text, ignoring common words like 'and', 'a', 'the', and uses them as a highly prioritized vocabulary set, named an optimized keyword dictionary 110, which contains an optimized and prioritized keyword positional index metadata set of each keyword position within the extracted text, to be sent to a speech to text conversion processor engine 112 to improve the speech to text conversion. The keyword prioritization steps, performed by prioritizer 108, include elimination and deprioritization of low value words (such as, the, a, and, etc) and prioritization of high value words as keywords. The obtained vocabulary set within the optimized keyword dictionary 110 is passed as input into the speech to text conversion processor 112, with the keywords having a higher priority than a standard processor dictionary vocabulary set 114.

The positional indexing method of the present invention has an optimization aspect within its keyword prioritization steps, named temporal association, which creates keyword positional index metadata by correlating each keyword temporal location with its position in the speech audio input. A word temporal location could be front, middle, end or timecode-based, if the slide change timecodes were captured. The optimization aspect can further modify the priority for keywords that were displayed during a particular speech audio segment and set them higher in the vocabulary set. Since most of the keywords in the presentation are discussed by the speakers when the slide is being viewed, and the rough temporal position of the words in the slides and the slide order is known, the accuracy of conversion is greatly increased and valid indexes are easily extracted, forming the optimized text 116.

Speech to text conversion processor 112 is a decision making tool which accepts and utilizes the prioritized keywords and temporal location information in the decision processing of context engines. Thus, the aspects of the present invention, which temporally associate keywords with the time-based speech audio/video media input source, yield to a much more accurate indexing and, therefore, translation and an improved overall capture, because the identified words are taken from the supporting materials before being applied to context engines.

The preferred method of the present invention can be successfully used in real time during a media-rich (audio, video, text, graphics) presentation, which may include common technologies, such as PowerPoint Slides, PDF files and scanned images in JPEG or other formats. While the presentation or captioned video is being captured, the text components are extracted using format-specific extraction tools, which may include scanning or OCR, required for non-standard formats. The positional indexing method of the present invention can also be applied to close caption data for a commercial video or to song lyrics for commercially recorded speech audio, if required.

Figure 2:
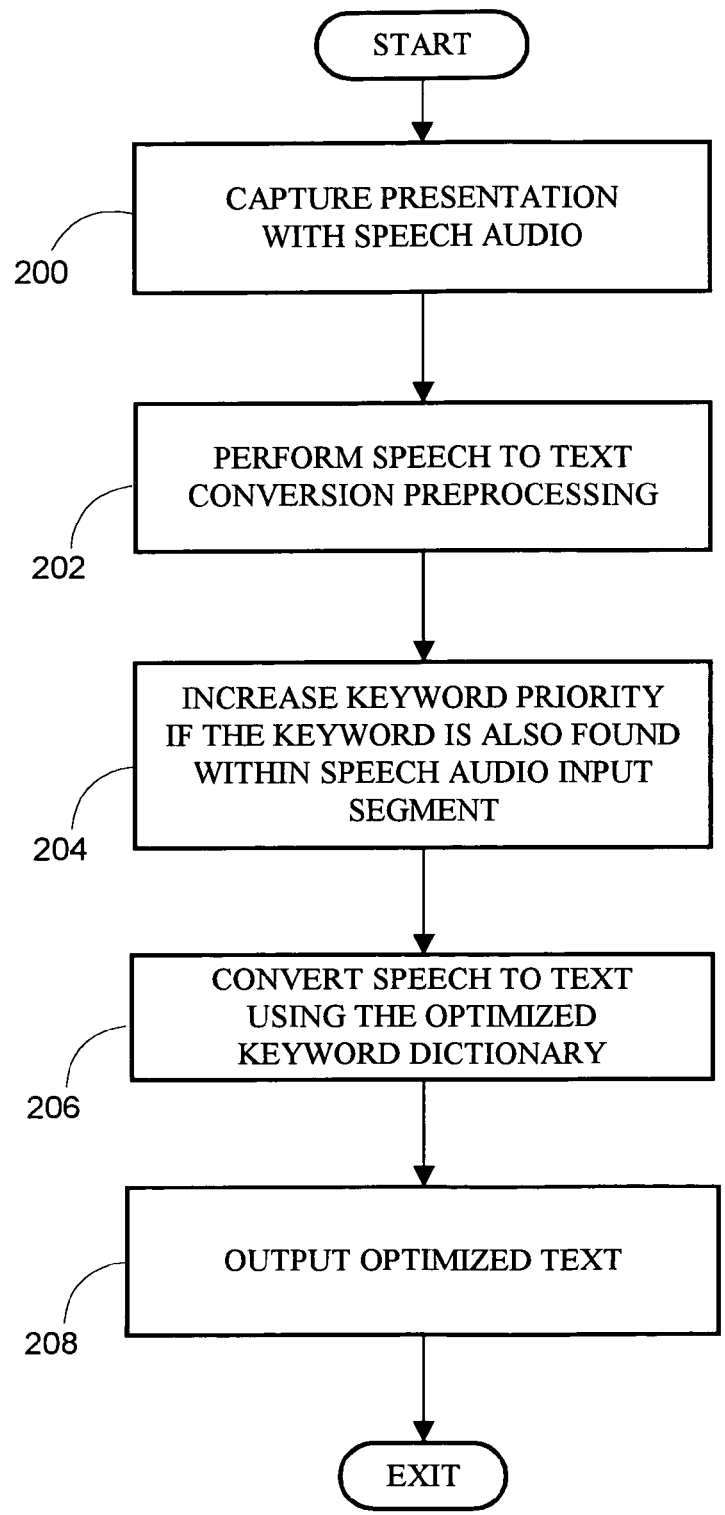
FIG. 2 illustrates a method for media speech to text conversion processing, according to the preferred embodiments of the present invention.
Figure 3:
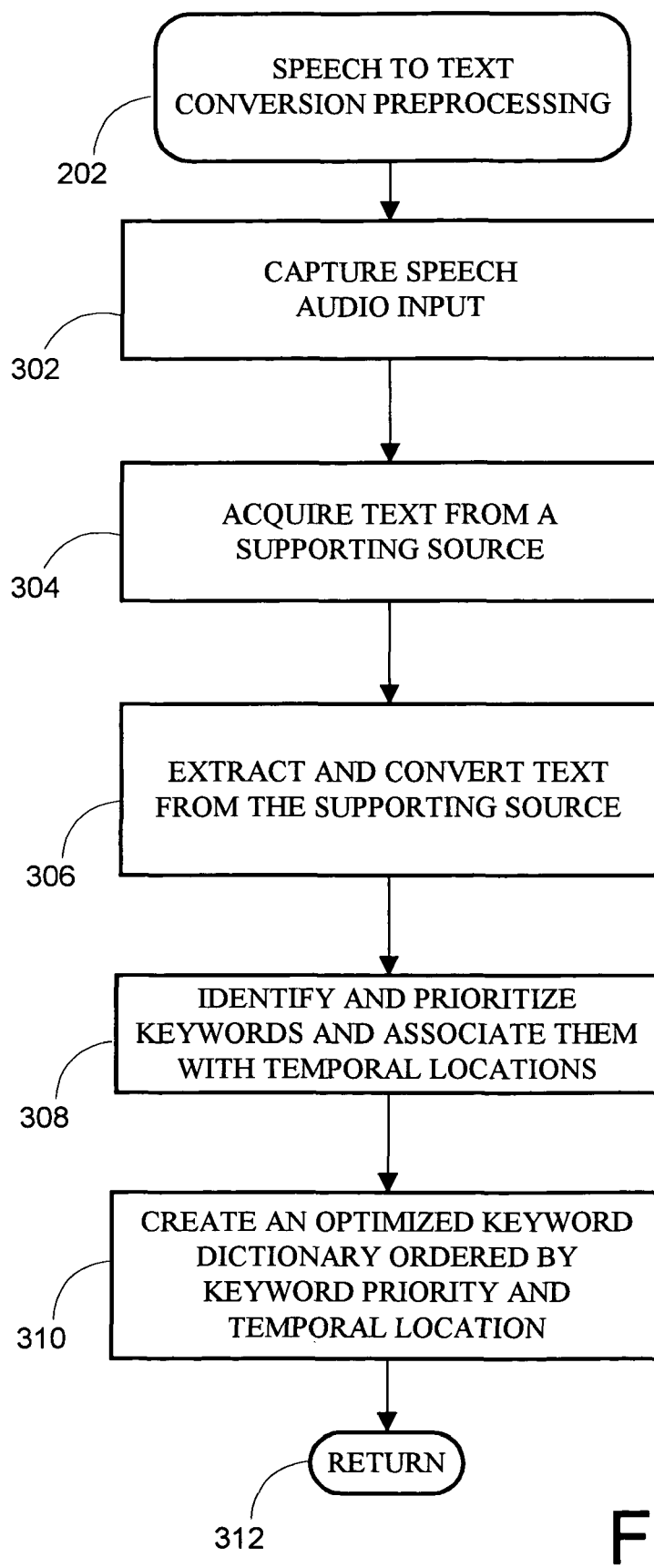
FIG. 3 illustrates a method for media speech to text conversion preprocessing, according to the preferred embodiments of the present invention.

The optimized speech to text conversion method of the present invention can work in real time and non-real time, and is shown in FIGS. 2 and 3.

In step 200 of FIG. 2 a conventional method is used to dynamically capture a presentation which usually has a common time or reference timecode. Speech source may be a live speaker presenting some materials to the public, speech audio recording or an audio-video multimedia presentation from which speech audio is extracted and captured as speech audio recording with timecode. Step 202 of FIG. 2 represents a subroutine of the present invention, used to preprocess speech to text conversion, as shown in FIG. 3.

Step 302 of FIG. 3 uses a conventional system to capture a speech audio input of the presentation, using well known methods, such as analog or digital capture from sources such as microphones. Step 304 acquires temporally-based and roughly synchronized supporting presentation displays, such as charts, slides, text, whiteboard data, chat, etc., typically in their native format, such as Powerpoint, PDF or text file, or to capture images, typically in JPEG, GIF or bitmap format, with the same reference timecode, to provide for the synchronization. If this is the audio-video multimedia presentation, the supporting presentation displays, such as charts, slides and text are extracted from this presentation.

In step 306 the captured supporting source, such as a presentation display or image is processed as necessary to extract and convert the text and/or keywords, by conventional technology, such as optical code readers, which scan an image and extract any text contained within the image, such as captions, labels and presentation text like titles, bullets and descriptions. As this text is extracted, it is associated with the timecode of the captured supporting presentation display or image to enable synchronization by time association of the presentation display or image with the speech audio recording. When the speech audio recording source is an audio-video multimedia presentation, such as broadcast media, possible text is closed caption text or timed text, available for extraction by well known methods, such as line 21 data extraction. Depending on the closed caption generation process, this text may already have a very high temporal correlation to the spoken audio recording, although it may also be from a non-optimum speech to text conversion processing engine.

In step 308 words are identified and prioritized as keywords by deprioritization and elimination of common 'low value' words, like prepositions, etc. In step 310 keywords are prioritized by a chosen criteria during linguistic analysis in order to create the optimized keyword dictionary 110. An optional method is prioritization by titles over nouns over verbs, possible when the chart format is known to the application. Extracted keywords are then associated with their temporal location and ordered by timecode and priority, within a user-definable timecode range, based on the assumption that the speaker will typically be discussing the concepts described in the presentation at or around the time that slide or chart is being displayed, possibly even reading portions of the chart or presentation materials. Subroutine 202 returns in step 312 to the main program of FIG. 2.

Step 204 of FIG. 2 shows a possible further optimization aspect of the present invention, based on prioritization of the keywords within a selected timecode range, due to the assumption that the presenter is most likely to read all or a portion of the chart title or diagram caption. Thus, it increases a keyword priority if an identified keyword from the supporting text is also found within a speech audio input segment. The ordered list of timecode prioritized keywords, as the optimized keyword dictionary 110, is then dynamically passed, in step 206, to the conventional speech to text conversion processing engine 112 on the first pass, as an enhanced input to dynamically improve accuracy of the speech audio recording by using temporally related data from the same context. The method of present invention thus optimizes the standard dictionary searches 114, allowing searching for words most likely to be under discussion in the timecode range for the speech audio recording and based on the same temporal presentation display. Using these keywords as optimization tools to the data being discussed in the supporting presentation display or image, the speech to text conversion processing engine 112 then searches for word or phrase matches in an increasing range of timecodes around the speech audio recording data, greatly increasing the probability of accurate matches when compared to unoptimized searching and producing optimized text output results in step 208.

An exemplary set of sample data keywords, their priority rank and timecode are shown in the following example.

| Keyword | Rank | Timecode |
|---|---|---|
| video | 1 | 00:00:01:00 |
| audio | 1 | 00:00:01:00 |
| player | 2 | 00:00:01:00 |
| codec | 3 | 00:00:02:30 |
| sound | 3 | 00:00:02:30 |
| image | 2 | 00:00:02:30 |
| client | 4 | 00:00:04:10 |
| streaming | 2 | 00:00:04:10 |
| videos | 1 | 00:00:05:07 |
| bitrate | 2 | 00:00:05:07 |
| testing | 3 | 00:00:05:07 |
| packets | 2 | 00:00:07:23 |
| hinting | 1 | 00:00:07:23 |
| stereo | 2 | 00:00:08:00 |

-continued

| Keyword | Rank | Timecode |
|---|---|---|
| user | 2 | 00:00:09:20 |
| success | 4 | 00:00:09:20 |

The present invention is useful in any field of media indexing, content management and processing, and speech recognition and processing, including voice browsing and voice control of speech audio and video libraries, commercial videos and advertisements, and television show archives.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for speech to text conversion preprocessing of a presentation with a speech audio, comprising:
   capturing a presentation speech audio input to be converted into text;
   preprocessing the presentation speech audio input prior to its speech to text conversion by temporally associating the speech audio input with at least one supporting text source from the same presentation containing common keywords; and
   creating an optimized and prioritized keyword positional index metadata set for inputting into a speech to text conversion processor.

2. The method according to claim 1, wherein the keyword positional index metadata set comprises a temporally-based keyword vocabulary set of an optimized keyword dictionary.

3. The method according to claim 1, wherein the step of creating the keyword positional index metadata set further comprises: extracting words from the supporting text source, limiting words to keywords, prioritizing the keywords, and temporally associating each keyword temporal location with its position in the speech audio input, for creating the keyword positional index metadata set.

4. The method according to claim 3, further comprising the step of further increasing the keyword priority within the speech audio input segment when the keyword temporal location is correlated with the keyword audio position.

5. The method according to claim 1, wherein the method is used in real time.

6. The method according to claim 1, wherein the presentation is selected from the group comprising audio-visual multimedia presentation, audio, video, text and graphics presentation, live speaker presentation, telephone conference, a recording, slides, video close caption, images and computer files.

7. The method according to claim 1, wherein the supporting text source is selected from the group comprising audio, video, text, graphics, slides, video close caption, images and computer files.

8. A computer-based system for speech to text conversion preprocessing of a presentation with a speech audio, comprising:
   means for capturing a presentation speech audio input to be converted into text;

a computer programmed to perform the steps of:
preprocessing the presentation speech audio input prior to its speech to text conversion by temporally associating the speech audio input with at least one supporting text source from the same presentation containing common keywords; and
creating an optimized and prioritized keyword positional index metadata set for inputting into a speech to text conversion processor.

9. The system according to claim 8, wherein the keyword positional index metadata set comprises a temporally-based keyword vocabulary set of an optimized keyword dictionary.

10. The system according to claim 8, wherein the step of creating the keyword positional index metadata set further comprises means for: extracting words from the supporting text source, limiting words to keywords, prioritizing the keywords, and temporally associating each keyword temporal location with its position in the speech audio input, for creating the keyword positional index metadata set.

11. The system according to claim 10, further comprising the means for further increasing the keyword priority within the speech audio input segment when the keyword temporal location is correlated with the keyword audio position.

12. The system according to claim 8, wherein the system is used in real time.

13. The system according to claim 8, wherein the presentation is selected from the group comprising audio-visual multimedia presentation, audio, video, text and graphics presentation, live speaker presentation, telephone conference, a recording, slides, video close caption, images and computer files.

14. The system according to claim 8, wherein the supporting text source is selected from the group comprising audio, video, text, graphics, slides, video close caption, images and computer files.

15. A computer program product embedded in a computer usable non-transitory medium, in a database management system, tangibly embodying a program of instructions executable by the computer to perform a computer-based method for speech to text conversion preprocessing of a presentation with a speech audio, comprising:
capturing a presentation speech audio input to be converted into text;
preprocessing the presentation speech audio input prior to its speech to text conversion by temporally associating the speech audio input with at least one supporting text source from the same presentation containing common keywords; and
creating an optimized and prioritized keyword positional index metadata set for inputting into a speech to text conversion processor.

16. The computer program product according to claim 15, wherein the keyword positional index metadata set comprises a temporally-based keyword vocabulary set of an optimized keyword dictionary.

17. The computer program product according to claim 15, wherein the step of creating the keyword positional index metadata set further comprises: extracting words from the supporting text source, limiting words to keywords, prioritizing the keywords, and temporally associating each keyword temporal location with its position in the speech audio input, for creating the keyword positional index metadata set.

18. The computer program product according to claim 17, further comprising the step of further increasing the keyword priority within the speech audio input segment when the keyword temporal location is correlated with the keyword audio position.

19. The computer program product according to claim 15, wherein the method is used in real time.

20. The computer program product according to claim 15, wherein the presentation is selected from the group comprising audio-visual multimedia presentation, audio, video, text and graphics presentation, live speaker presentation, telephone conference, a recording, slides, video close caption, images and computer files.

21. The computer program product according to claim 15, wherein the supporting text source is selected from the group comprising audio, video, text, graphics, slides, video close caption, images and computer files.

* * * * *